(12) United States Patent
Whittle et al.

(10) Patent No.: US 11,149,560 B2
(45) Date of Patent: Oct. 19, 2021

(54) AIRFOIL ASSEMBLY WITH CERAMIC MATRIX COMPOSITE PARTS AND LOAD-TRANSFER FEATURES

(71) Applicants: Rolls-Royce plc, London (GB); Rolls-Royce Corporation, Indianapolis, IN (US); Rolls-Royce North American Technologies Inc., Indianapolis, IN (US)

(72) Inventors: Michael J. Whittle, London (GB); Daniel K. Vetters, Indianapolis, IN (US); Ted J. Freeman, Danville, IN (US); Eric Koenig, Fishers, IN (US); Jeff Crutchfield, Indianapolis, IN (US); Jeffrey A. Walston, Indianapolis, IN (US); David J. Thomas, Brownsburg, IN (US)

(73) Assignees: Rolls-Royce plc; Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 255 days.

(21) Appl. No.: 16/545,784

(22) Filed: Aug. 20, 2019

(65) Prior Publication Data
US 2021/0054748 A1    Feb. 25, 2021

(51) Int. Cl.
*F01D 5/28* (2006.01)
*F01D 5/18* (2006.01)

(52) U.S. Cl.
CPC .............. *F01D 5/282* (2013.01); *F01D 5/18* (2013.01); *F01D 5/284* (2013.01); *F05D 2240/55* (2013.01); *F05D 2240/80* (2013.01); *F05D 2260/30* (2013.01); *F05D 2300/6033* (2013.01)

(58) Field of Classification Search
CPC . F01D 5/282; F01D 5/18; F01D 5/284; F05D 2260/30; F05D 2240/55; F05D 2240/80; F05D 2300/6033
See application file for complete search history.

(56) References Cited

U.S. PATENT DOCUMENTS

| | | |
|---|---|---|
| 6,045,310 A | 4/2000 | Miller et al. |
| 6,514,046 B1 | 2/2003 | Morrison et al. |
| 6,884,030 B2 | 4/2005 | Darkins, Jr. et al. |
| 7,452,189 B2 | 11/2008 | Shi et al. |
| 8,292,580 B2 | 10/2012 | Schiavo et al. |
| 9,546,557 B2 | 1/2017 | Grooms, III et al. |
| 9,915,159 B2 | 3/2018 | Huizenga et al. |
| 10,094,239 B2 | 10/2018 | Freeman et al. |
| 10,273,818 B2 | 4/2019 | Vetters et al. |
| 2010/0021290 A1 | 1/2010 | Schaff et al. |
| 2010/0166565 A1* | 7/2010 | Uskert ............ F01D 5/10 416/226 |
| 2016/0123163 A1 | 5/2016 | Freeman et al. |

(Continued)

*Primary Examiner* — Jacob M Amick
*Assistant Examiner* — Charles J Brauch
(74) *Attorney, Agent, or Firm* — Barnes & Thornburg LLP

(57) ABSTRACT

An airfoil assembly includes a vane that includes an outer platform, an inner platform, and an airfoil. The outer platform defines an outer boundary of a gas path. The inner platform is spaced apart axially from the outer platform relative to an axis and defines an inner boundary of the gas path. The airfoil extends axially between and interconnects the outer platform and the inner platform.

20 Claims, 6 Drawing Sheets

(56) References Cited

U.S. PATENT DOCUMENTS

| | | |
|---|---|---|
| 2016/0290147 A1 | 10/2016 | Weaver |
| 2017/0022833 A1 | 1/2017 | Heitman et al. |
| 2018/0135421 A1* | 5/2018 | Propheter-Hinckley ..................... F04D 29/023 |
| 2019/0048726 A1* | 2/2019 | Spangler ................. F01D 5/282 |

* cited by examiner

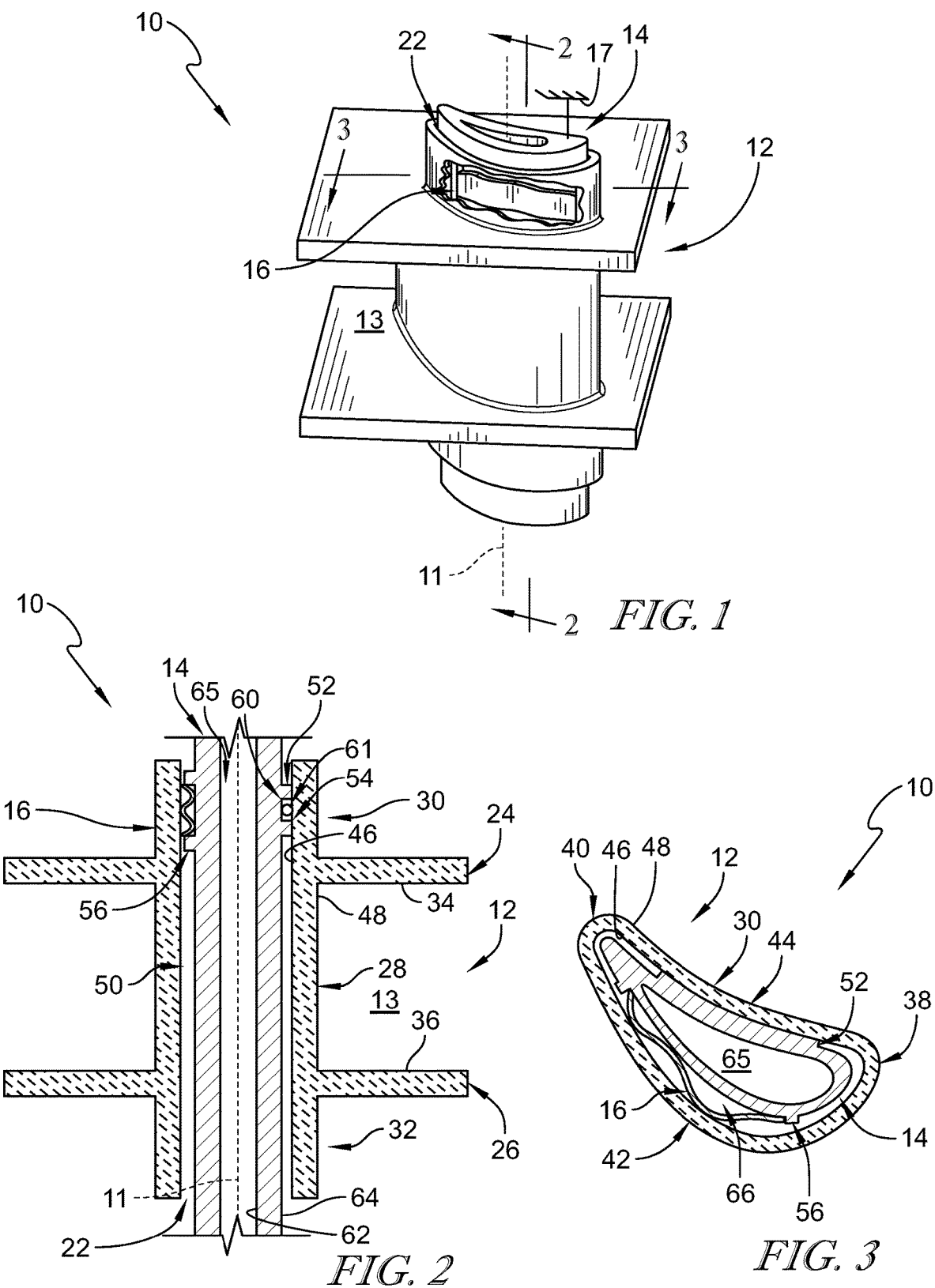

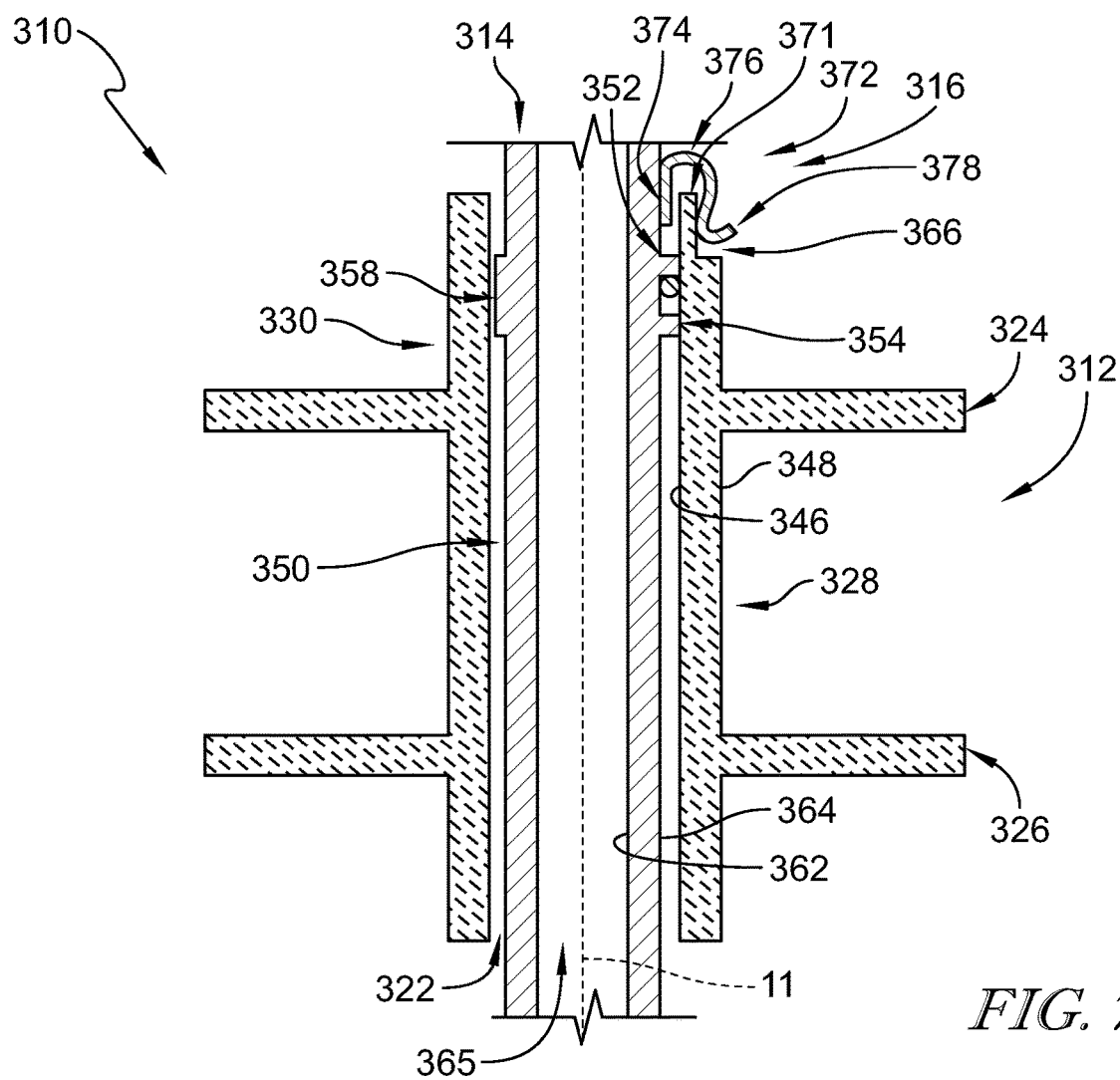
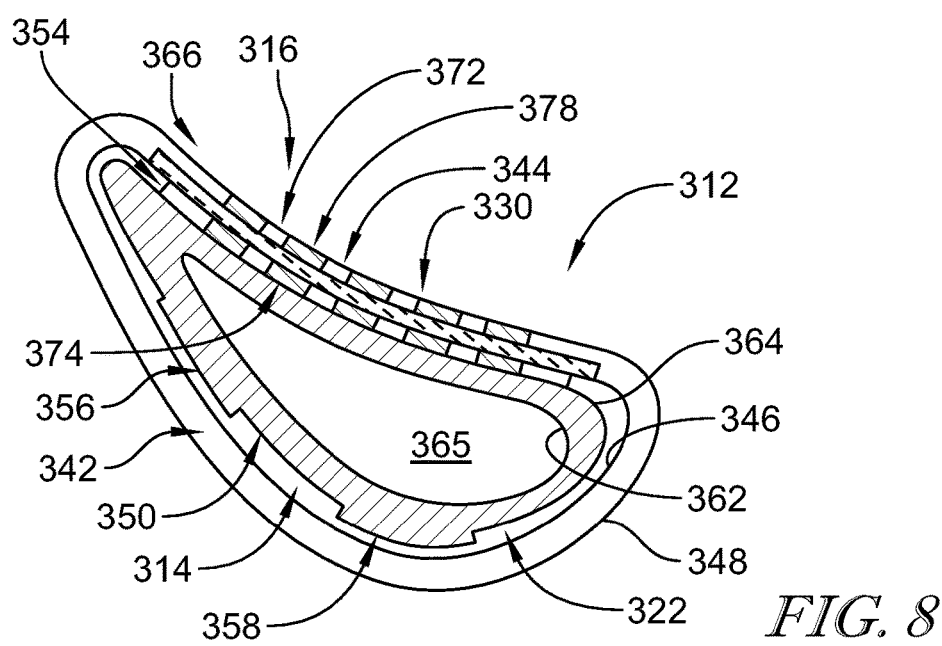
FIG. 7
FIG. 8

AIRFOIL ASSEMBLY WITH CERAMIC MATRIX COMPOSITE PARTS AND LOAD-TRANSFER FEATURES

FIELD OF THE DISCLOSURE

The present disclosure relates generally to airfoil assemblies for gas turbine engines, and more specifically to airfoils that comprise ceramic-containing materials

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength limitations of composite materials.

SUMMARY

The present disclosure may comprise one or more of the following features and combinations thereof.

An airfoil assembly for a gas turbine engine may include a ceramic matrix composite vane, a metallic support spar, and a bias member. The ceramic matrix composite vane may be adapted to interact with hot gases flowing through a gas path of the gas turbine engine during use of the airfoil assembly. The metallic support spar may be configured to receive forces loads from the ceramic matrix composite vane. The bias member may be configured to urge the ceramic matrix composite vane and the metallic support spar toward each other.

In some embodiments, the ceramic matrix composite vane may include an outer platform, an inner platform, an airfoil, and an outer vane mount. The outer platform may define an outer boundary of the gas path. The inner platform may be spaced apart axially from the outer platform relative to an axis to define an inner boundary of the gas path. The airfoil may extend axially between and interconnect the outer platform and the inner platform. The outer vane mount may extend axially outward away from the outer platform, In some embodiments, the metallic support spar may include a strut and at least one load-transfer tab. The strut may extend axially through an interior cavity formed in the ceramic matrix composite vane. The at least one load-transfer tab may extend from the strut toward the outer vane mount of the ceramic matrix composite vane and engage the outer vane mount to transmit the force loads from the ceramic matrix composite vane to the metallic support spar during use of the airfoil assembly.

In some embodiments, the bias member may be configured to urge the outer vane mount and the at least one load-transfer tab toward each other on a pressure side of the ceramic matrix composite vane. The bias member may be configured to maintain engagement of the at least one load-transfer tab with the outer vane mount of the ceramic matrix composite vane. In some embodiments, the bias member may be located in the interior cavity between the outer vane mount and the metallic support spar on a suction side of the ceramic matrix composite vane.

In some embodiments, the strut of the metallic support spar may be shaped to include a locating notch. The locating notch may open toward the suction side of the ceramic matrix composite vane and receive the bias member to hold the bias member in place relative to the ceramic matrix composite vane.

In some embodiments, the bias member may include a clip. The clip may be arranged on the pressure side of the ceramic matrix composite vane. The clip may receive a portion of the outer vane mount and a portion of the metallic support spar in the clip.

In some embodiments, the bias member may include a plurality of clips. The plurality of clips may be arranged along the pressure side of the ceramic matrix composite vane.

In some embodiments, the bias member may include a clip. The clip may be fixed with the strut of the metallic support spar on a pressure side of the metallic support spar. The clip may receive a radial terminating end of the outer vane mount.

In some embodiments, the airfoil assembly may further include a fastener. The fastener may extend into the outer vane mount and the metallic support spar to engage the outer vane mount with the at least one load-transfer tab.

In some embodiments, the metallic support spar may include a first load-transfer tab and a second load-transfer tab. The second load-transfer tab may be spaced apart axially from the first load-transfer tab to define a seal channel therebetween. In some embodiments, the first load-transfer tab and the second load-transfer tab may extend along a perimeter of the pressure side of the metallic support spar.

In some embodiments, the airfoil assembly may further include a seal. The seal may be arranged in the seal channel.

According to another aspect of the disclosure, an airfoil assembly may include a vane, a support spar, and a bias member. The support spar may extend axially through a portion of the vane. The bias member may be configured to urge the vane and a portion of the support spar into engagement with each other.

In some embodiments, the vane may include an outer platform, an inner platform, and an airfoil. The inner platform may be spaced apart axially from the outer platform relative to an axis. The airfoil may extend axially between and interconnect the outer platform and the inner platform.

In some embodiments, the vane may include a leading edge, a trailing edge, a pressure side, and a suction side. In some embodiments, the support spar may be shaped to include at least one load-transfer tab that extends from the support spar and engages with the vane on the pressure side of the vane. In some embodiment, the bias member may extend between the ceramic matrix composite vane and the metallic support spar on a suction side of the vane.

In some embodiments, the vane may further include an outer vane mount. The outer vane mount may extend axially away from the outer platform.

In some embodiments, the bias member may include a clip. The clip may receive a portion of the outer vane mount and a portion of the support spar in the clip.

In some embodiments, the bias member may include a clip. The clip may be fixed with the support spar on a pressure side of the support spar. The clip may receive a radial terminating end of the outer vane mount.

In some embodiments, the bias member may include a fastener. The fastener may extend into the outer vane mount and the metallic support spar to engage the outer vane mount with at least one load-transfer tab formed in the support spar.

In some embodiments, the outer vane mount may include an inner surface and an outer surface. The inner surface may define a portion of an interior cavity that extends axially into the vane. The outer surface may be opposite the inner surface.

In some embodiments, the support spar may include a strut and at least one load-transfer tab. The strut may extend axially through the interior cavity of the vane. The at least one load-transfer tab may extend from the support spar and engage with the inner surface of the outer vane mount on a pressure side of the vane.

In some embodiments, the bias member may be located in the interior cavity between inner surface of the outer vane mount and the metallic support spar on a suction side of the vane. In some embodiments, the bias member may be arranged on the pressure side of the vane. In some embodiments, the bias member may be configured to urge the at least one load-transfer tab toward engagement with the outer vane mount on the pressure side of the vane.

According to another aspect of the disclosure, a method may include providing a vane and a support spar. The vane may include an outer platform, an inner platform spaced apart axially from the outer platform relative to an axis, an airfoil that extends axially between and interconnects the outer platform and the inner platform, and an outer vane mount that extends axially outward away from the outer platform. The support spar may include a strut and a load-transfer tab that extends from the strut.

In some embodiments, the method further includes arranging the support spar through an interior cavity that extends axially through the vane and biasing the vane and the support spar toward one another to cause the load-transfer tab to engage the outer vane mount. In some embodiments, the biasing step may include engaging the vane and the support spar with a bias member.

These and other features of the present disclosure will become more apparent from the following description of the illustrative embodiments.

BRIEF DESCRIPTION OF THE DRAWINGS

FIG. 1 is a perspective view of an airfoil assembly for a gas turbine engine that includes a ceramic matrix composite vane adapted to interact with hot gases flowing through a gas path of the gas turbine engine, a metallic support spar that extends axially through an interior cavity formed in the vane, and a bias member configured to urge the vane and support spar toward each other;

FIG. 2 is a cross-sectional view of the airfoil assembly of FIG. 1 taken along line 2-2 showing the support spar includes a strut that extends axially through the interior cavity of the vane and load-transfer tabs that extend from the strut and engage an outer vane mount included in the vane and located outside of the gas path to transmit force loads from the vane to the support spar;

FIG. 3 is a cross-sectional view of the airfoil assembly of FIG. 1 taken along line 3-3 showing the outer vane mount includes an inner surface that defines a portion of the interior cavity of the vane and an outer surface opposite the inners surface, and further showing the bias member is arranged between the inner surface of the outer vane mount and the support spar on a suction side of the vane to urge the load-transfer tabs into engagement with the outer vane mount on the pressure side of the vane;

FIG. 7 is a cross-sectional view of another embodiment of an airfoil assembly showing the airfoil assembly includes a vane, a support spar that extends axially through an interior cavity formed in the vane, and bias member configured to urge the vane and support spar toward each other, and further showing the bias member includes a clip fixed to the support spar that receives a portion of the vane to urge load-transfer tabs formed on the support spar into engagement with the vane;

FIG. 8 is a cross-sectional view of the airfoil assembly of FIG. 7 showing the airfoil assembly includes a plurality of clips arranged along a pressure side of the vane;

DETAILED DESCRIPTION OF THE DRAWINGS

Figure 4:
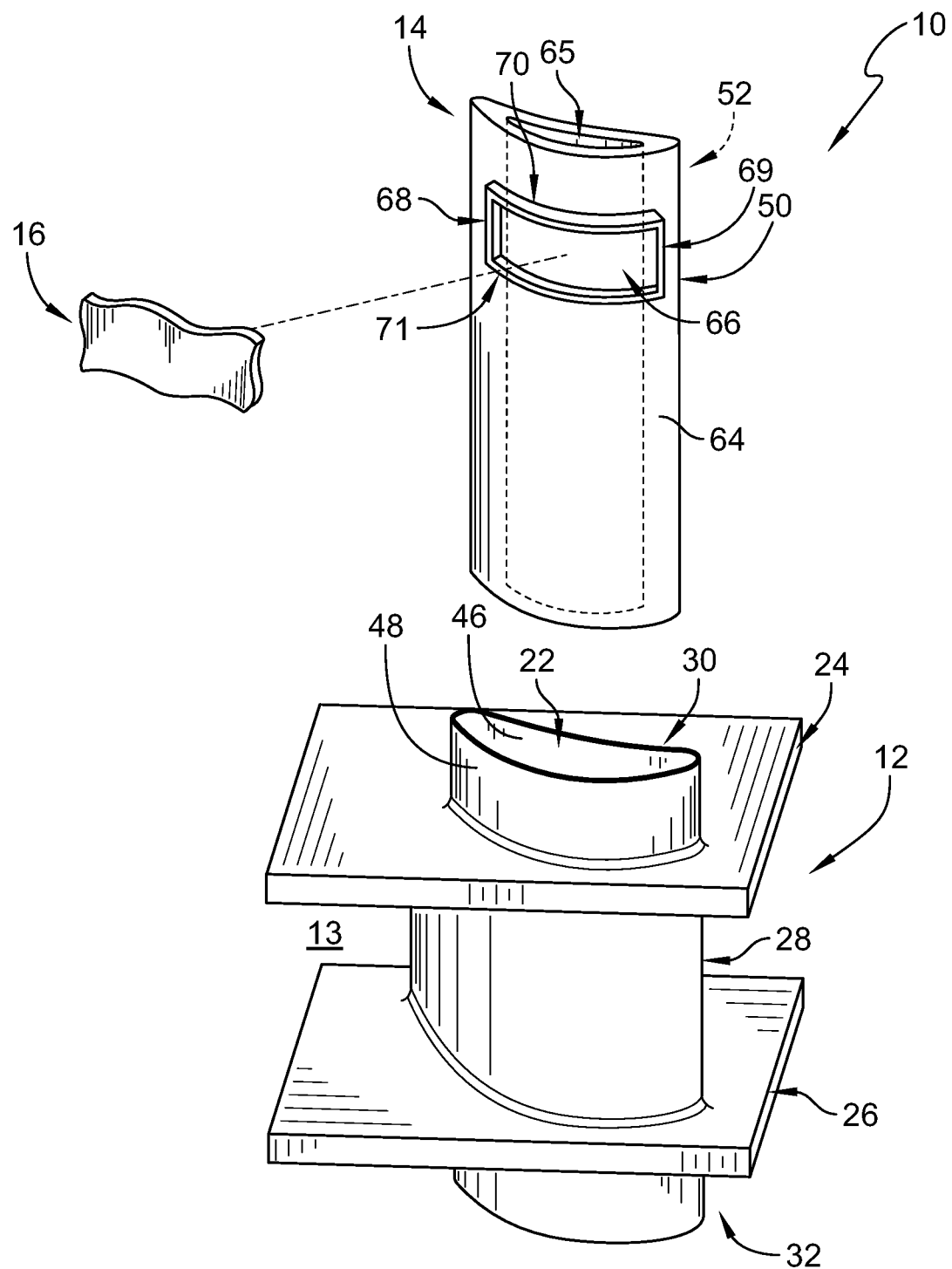
FIG. 4 is an exploded view of the airfoil assembly of FIG. 1 showing the strut of support spar is shaped to include a locating notch that receives the bias member to hold the bias member in place relative to the vane.

For the purposes of promoting an understanding of the principles of the disclosure, reference will now be made to a number of illustrative embodiments illustrated in the drawings and specific language will be used to describe the same.

An airfoil assembly 10 according to the present disclosure and adapted for used in a gas turbine engine is shown in FIG. 1. The airfoil assembly includes a vane 12, a support spar 14, and a bias member 16 as shown in FIGS. 1-4. The vane 12 is adapted to interact with hot gases flowing through a gas path 13 of the gas turbine engine during use of the airfoil assembly 10. The support spar 14 extends axially through an interior cavity 22 formed in the vane 12 and is configured to receive force loads from the vane 12 at a location outside the gas path 13. The bias member 16 is configured to urge a portion of the vane 12 and a portion of the support spar 14 toward each other to maintain orientation and engagement of the components so that the force loads are transferred from the vane 12 to the support spar 14.

The bias member 16 maintains engagement of the support spar 14 and the vane 12 even at cold build of the turbine engine and when the turbine engine is not operating. As a result, when the gas turbine engine starts up, the support spar 14 and the vane 12 are already engaged so that force loads applied to a pressure side 44 of the vane 12 by the hot gases do not cause the vane 12 to move relative to the support spar 14 and strike the support spar 14 potentially causing damage to the assembly 10.

The vane 12 comprises ceramic matrix composite materials, while the support spar 14 comprises metallic materials in the illustrative embodiment. The ceramic matrix composite vane 12 is adapted to withstand high temperatures, but may have a relatively low strength compared to the metallic support spar 14. The metallic support spar 14 provides structural strength to the assembly 10 receiving force loads applied to the vane 12 and transferring the loads out through other components of the engine such an engine casing 17. However, the metallic support spar 14 may not be capable of withstanding the high temperatures experienced by the ceramic matrix composite vane 12.

Due to the difference in coefficients of thermal expansion and structural strength between the ceramic matrix composite and metallic materials, transferring the loading of the vane 12 to the support spar 14 may be difficult. The bias member 16 is configured to control the orientation of the vane 12 relative to the support spar 14 to provide a determinate load transfer from the vane 12 to the support spar 14 out through the supporting structure. In some embodiments, the support structure may be an outer mount support or a turbine case 17 of the gas turbine engine as suggested in FIG. 1.

The ceramic matrix composite vane 12 includes an outer platform 24, an inner platform 26, an airfoil 28, an outer vane mount 30, and an inner vane mount 32 as shown in FIGS. 2 and 4. The outer platform 24 defines an outer boundary 34 of the gas path 13. The inner platform 26 is spaced apart axially from the outer platform 24 relative to an axis 11 to define an inner boundary 36 of the gas path 13. The airfoil 28 extends axially between and interconnects the outer platform 24 and the inner platform 26. The outer vane mount 30 extends axially outward away from the outer platform 24 and the inner vane mount 32 extends axially inward away from the inner platform 26.

Illustratively, the outer platform 24, the inner platform 26, the airfoil 28, the outer vane mount 30, and the inner vane mount 32 are integrally formed to provide a single-piece, unitary component. In other embodiments, the vane 12 may be formed from a number of separate components. In other embodiments, the vane 12 may comprise metal, composite, ceramic, or ceramic matrix composite materials.

The vane 12 also has a leading edge 38, a trailing edge 40, a suction side 42, and pressure side 44 as shown in FIG. 3. The trailing edge 40 is radially spaced apart from the leading edge 38 of the vane. The pressure side 44 is circumferentially spaced apart from the suction side 42. The suction side 42 and pressure side 44 extend between and interconnect the leading edge 38 and the trailing edge 40.

The outer vane mount 30 includes an inner surface 46 and an outer surface 48 as shown in FIGS. 2 and 3. The inner surface 46 defines a portion of the interior cavity 22. The outer surface 48 is opposite the inner surface 46. In the illustrative embodiment, the support spar 14 engages the vane 12 on the inner surface 46 of the outer vane mount 30.

The support spar 14 includes a strut 50, at least one load-transfer tab 52, and a retention feature 56 as shown in FIGS. 2 and 3. The strut 50 extends axially through the interior cavity 22 of the vane 12. The load-transfer tab 52 extends radially from the strut 50 and engages the inner surface 46 of the outer vane mount 30 at a location outside the gas path 13. The retention feature 56 extends from the strut 50 opposite the at least one load-transfer tab 52 and is configured to engage the inner surface 46 of the outer vane mount 30 during off-design conditions of the engine.

In the illustrative embodiment, the support spar 14 includes at least two load-transfer tabs 52, 54 as shown in FIGS. 2 and 4. The second load-transfer tab 54 is spaced axially inward from the first load-transfer tab 52 to form a seal channel 60 therebetween. The seal channel 60 receives a seal member 61 as shown in FIG. 2.

During used of the airfoil assembly 10, the force loads acting on the vane 12 from the hot gases apply a force against the pressure side 44 of the airfoil 28. The force against the pressure side 44 urges the vane 12 toward and into engagement with the load-transfer tab 52 located on the pressure side 44. The load-transfer tab 52 limits the amount of movement the vane 12 may experience and receive the force loads acting on the vane 12. The load-transfer tab 52 transmits the loads to the turbine case 17 or other mount features. Illustratively, the load-transfer tabs 52, 54 are located outside of the gas path 13 which may reduce cooling air used for cooling the load-transfer tabs 52, 54.

In the illustrative embodiment, the load-transfer tab 52 engages the inner surface 46 of the outer vane mount 30 on the pressure side 44 to receive force loads from the vane 12. In other embodiments, the load-transfer tab 52 may engage the outer surface 48 of the outer vane mount 30 to receive force loads from the vane 12. In other embodiments, the load-transfer tabs 52, 54 are located axially within the gas path 13 and engage the airfoil 28.

The strut 50 of the support spar 14 is hollow in the illustrative embodiments and includes an inner strut surface 62 and an outer strut surface 64 as shown in FIGS. 2-4. The inner strut surface 62 defines a channel 65 that extends axially through the strut 50 of the support spar 14. The outer strut surface 64 is opposite the inner strut surface 62. In some embodiments, the strut 50 may be hollow and include cooling holes to transmit cooling air to the vane 12 and/or into the inter-disk cavity axially inward of the vane 12. In other embodiments, the support spar 14 is solid.

In the illustrative embodiment, the strut 50 of the support spar 14 is also shaped to include a bias member locating notch 66 as shown in FIGS. 2-4. The bias member locating notch 66 extends into the outer strut surface 64 of the support spar 14 and opens toward the inner surface 46 of the outer vane mount 30. The locating notch 66 is sized to receive the bias member 16 and hold the bias member 16 in place relative to the ceramic matrix composite vane 12. The locating notch 66 is also configured to control the compression of the bias member 16. As such, the bias member 16 is free to compress until the locating notch 66 engages the outer vane mount 30.

In the illustrative embodiment, the bias member locating notch 66 extends into the outer strut surface 64 of the support spar 14 such that the retention feature 56 extends around the locating notch 66. The retention feature 56 extends from the strut 50 of the support spar 14 on all sides of the locating notch 66.

In the illustrative embodiment, the load-transfer tabs 52, 54 extend from the outer strut surface 64 of the strut 50 and engage the outer vane mount 30 along a perimeter of the pressure side 44 of the vane 12 as shown in FIGS. 3 and 4. In other embodiments, the support spar 14 may include more than two load-transfer tabs 52, 54 that are spaced apart along the perimeter of the pressure side 44 of the vane 12.

The retention feature 56 includes a first axially-extending tab 68, a second axially-extending tab 69, a first radially-extending tab 70, and a second radially-extending tab 71 as shown in FIG. 4. The second radially-extending tab 71 is axially spaced apart from the first radially-extending tab 70. The radially-extending tabs 70, 71 extend along the suction side 42 of the vane 12. The axially-extending tabs 68, 69 extend between and interconnect the radially-extending tabs 70, 71.

In the illustrative embodiment, the bias member 16 is a wave spring 16 as shown in FIGS. 2 and 3. The wave spring 16 extends along a perimeter of the pressure side 44 of the vane 12. In other embodiments, the bias member 16 may include a plurality of springs 16 spaced along the perimeter of the pressure side 44 of the vane 12. In other embodiments, the bias member 16 may be compliant layer or another suitable biasing element.

In some embodiments, the bias member 16 may extend radially through the vane 12. In other embodiments, the airfoil assembly 10 may include a plurality of bias members spaced apart along the perimeter of the pressure side 44 of the vane 12.

Figure 5:
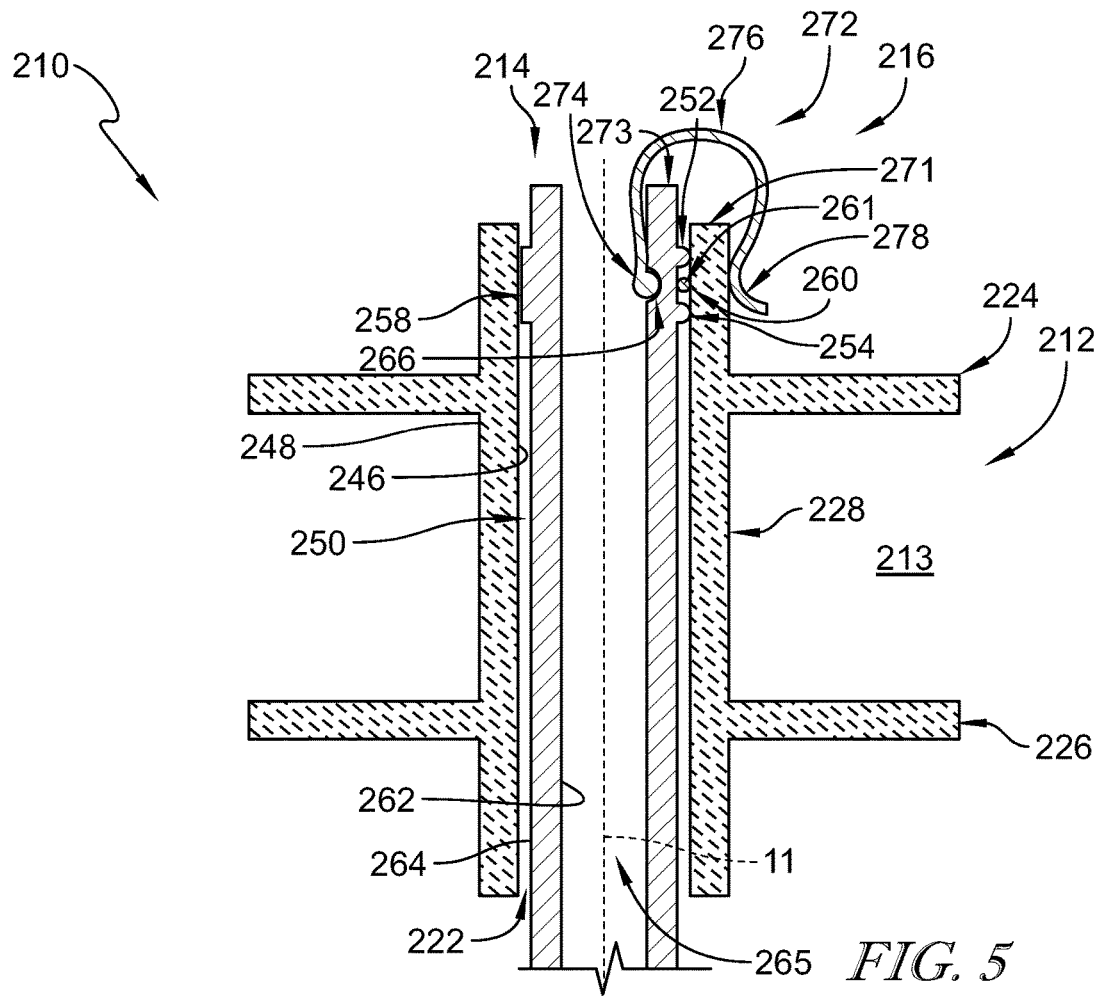
FIG. 5 is a cross-sectional view of another embodiment of an airfoil assembly showing the airfoil assembly includes a vane, a support spar that extends axially through an interior cavity formed in the vane, and bias member configured to urge the vane and support spar toward each other, and further showing the bias member includes a clip that receives a portion of the vane and a portion of the support spar to urge load-transfer tabs formed on the support spar into engagement with the vane.
Figure 6:
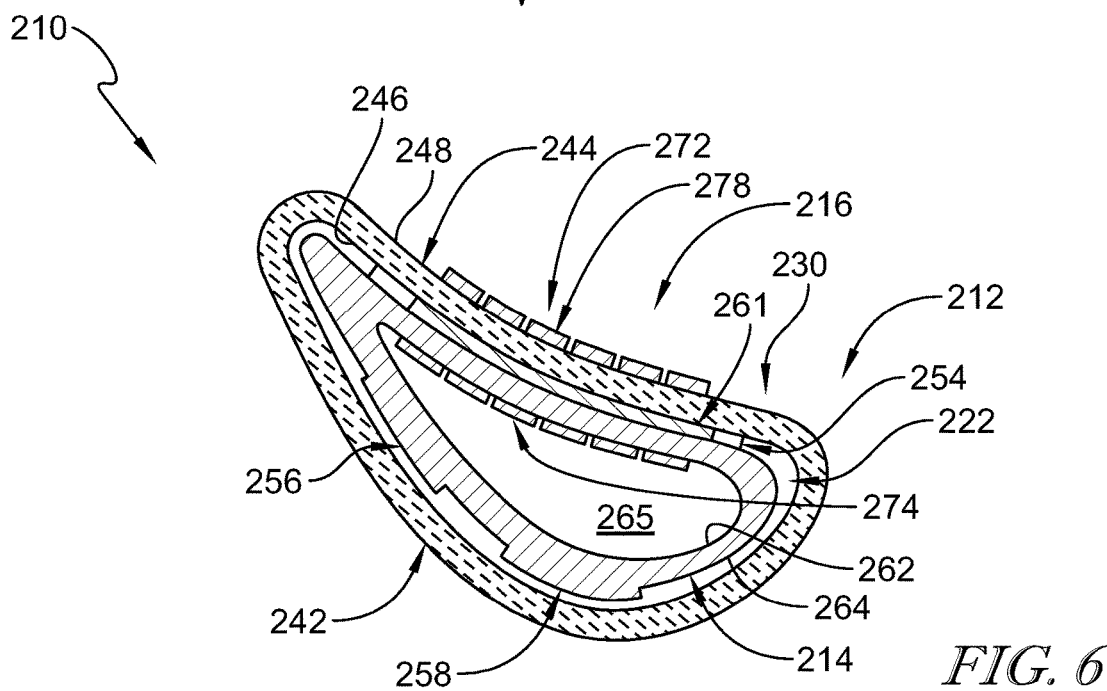
FIG. 6 is a cross-sectional view of the airfoil assembly of FIG. 5 showing the airfoil assembly includes a plurality of clips arranged along a pressure side of the vane.

Another embodiment of an airfoil assembly 210 in accordance with the present disclosure is shown in FIGS. 5 and 6. The airfoil assembly 210 is substantially similar to the airfoil assembly 10 shown in FIGS. 1-4 and described herein. Accordingly, similar reference numbers in the 200 series indicate features that are common between the airfoil assembly 10 and the airfoil assembly 210. The description of the airfoil assembly 10 is incorporated by reference to apply to the airfoil assembly 210, except in instances when it conflicts with the specific description and the drawings of the airfoil assembly 210.

The airfoil assembly includes a ceramic matrix composite vane 212, a metallic support spar 214, and a bias member 216 as shown in FIGS. 5 and 6. The vane 212 is adapted to interact with hot gases flowing through a gas path 213 of the gas turbine engine during use of the airfoil assembly 210. The support spar 214 extends axially through an interior cavity 222 formed in the vane 212 and is configured to receive force loads from the vane 212. The bias member 216 is configured to urge a portion of the vane 212 and a portion of the support spar 214 toward each other maintain engagement of the components so that the force loads are transferred from the vane 212 to the support spar 214.

The ceramic matrix composite vane 212 includes an outer platform 224, an inner platform 226, an airfoil 228, and an outer vane mount 230 as shown in FIGS. 5 and 6. The inner platform 226 is spaced apart axially from the outer platform 224 relative to the axis 11 define inner and outer boundaries of the gas path 213. The airfoil 228 extends axially between and interconnects the outer platform 224 and the inner platform 226. The outer vane mount 230 extends axially outward away from the outer platform 224.

The spar 214 includes a strut 250, load-transfer tabs 252, 254, and at least one retention tab 256 as shown in FIGS. 5 and 6. The strut 250 extends axially through the interior cavity 222 of the vane 212. The load-transfer tabs 252, 254 extends from the strut 250 and engages the inner surface 246 of the outer vane mount 230 outside the gas path 213. The retention tab 256 extends from the strut 250 opposite the load-transfer tabs 252, 254 and is configured to engage an inner surface 246 of the outer vane mount 230 during off-design conditions of the engine and to limit movement of the vane 212 during a surge event.

In the illustrative embodiment, the second load-transfer tab 254 is axially spaced apart from the first load-transfer tab 252 to define a seal channel 260 therebetween as shown in FIGS. 5 and 6. The seal channel 260 is configured to receive a seal member 261 to seal between the tabs 252, 254. Both the first and second load-transfer tabs 252, 254 are engaged with the outer surface 248 of the outer vane mount 230 along the pressure side 244 of the vane 212.

In the illustrative embodiment, the load-transfer tabs 252, 254 are continuous rails that extend along and engage the pressure side 244 of the vane 212 on the outer vane mount 230. In other embodiments, the load-transfer tabs 252, 254 may be spaced apart from each other along the pressure side 244 of the vane 212. The load-transfer tabs 252, 254 may be discrete or elongated members.

In the illustrative embodiment, the support spar 214 includes at least two retention tabs 256, 258 as shown in FIG. 6. The retention tabs 256, 258 extend from the strut 250 toward the outer vane mount 230 of the vane 212 on a suction side 242 of the vane 212. The second retention tab 258 is spaced apart from the first retention tab 256 along the suction side 242 of the vane 212.

In the illustrative embodiment, the strut 250 of the support spar 214 is hollow and includes an inner strut surface 262 and an outer strut surface 264 as shown in FIGS. 5 and 6. The inner strut surface 262 defines a channel 265 that extends axially through the strut of the support spar 214. The outer strut surface 264 is opposite the inner strut surface 262. In some embodiments, the strut 250 may be hollow and include cooling holes to transmit cooling air from to the vane 212 and/or into the inter-disk cavity axially inward of the vane 212.

The inner strut surface 262 is shaped to include a bias member locating notch 266 as shown in FIG. 5. The bias member locating notch 266 extends into the inner strut surface 262 and opens toward the channel 265. The locating notch 266 is sized to receive the bias member 216 and hold the bias member 216 in place relative to the ceramic matrix composite vane 212.

The bias member 216 includes a clip 272 as shown in FIG. 5. The clip 272 is arranged on the pressure side 244 of the ceramic matrix composite vane 212 and receives a portion of the outer vane mount 230 and a portion of the support spar 214 in the clip 272. In the illustrative embodiment, the clip 272 receives an axial terminating end 271 of the vane 212 and an axial terminating end 273 of the support spar 214. The clip 272 is removably coupled with the support spar 214 and the vane 212.

The clip 272 includes a locating end 274, a curved biasing portion 276, and a clip head 278 as shown in FIGS. 5 and 6. The locating end 274 is arranged in the locating notch 266 formed in the strut 250. The curved biasing portion 276 extends from the locating end 274 and around the axial outer ends 271, 273 of the vane 212 and support spar 214 into the interior cavity 222. The clip head 278 extends from the curved biasing portion 276 and engages the outer surface 248 of the outer vane mount 230. The curved biasing portion is configured to maintain engagement of the clip head 278 with the outer surface 248 of the outer vane mount 230.

In the illustrative embodiment, the airfoil assembly 210 includes a plurality of bias members 216 or clips 272 as shown in FIG. 6. Each of the clips 272 are spaced along the pressure side 244 of the vane 212. In other embodiments, the biasing member 216 may be a single clip 272 that extends along the pressure side 244 of the vane 212.

In some embodiments, the support par 214 may couple with the outer mount support to couple the support spar 214 to the casing 17. The outer mount support may include a wall located radially outward of the clip 272. The wall, along with the notch 266, may help locate the clip 272. In some embodiments, the wall may be configured to maintain the engagement of the clip 272 with the vane 212 and the support spar 214 by blocking the clip 272 from backing off the components during operation of the engine.

In some embodiments, the airfoil assembly 210 may include a single clip 272 with a locating end 274 and plurality of clip heads 276, 278. The locating end 274 may extend along the pressure side 244 of the vane 212 and the plurality of clip heads 276, 278 may be spaced apart along the pressure side 244 of the vane 212 and each extend from the locating end 274 around a portion of the vane 212.

Another embodiment of an airfoil assembly 310 in accordance with the present disclosure is shown in FIGS. 7 and 8. The airfoil assembly 310 is substantially similar to the airfoil assembly 10 shown in FIGS. 1-4 and described herein. Accordingly, similar reference numbers in the 300 series indicate features that are common between the airfoil assembly 10 and the airfoil assembly 310. The description of the airfoil assembly 10 is incorporated by reference to apply to the airfoil assembly 310, except in instances when it conflicts with the specific description and the drawings of the airfoil assembly 310.

The airfoil assembly includes a ceramic matrix composite vane 312, a metallic support spar 314, and a bias member 316 as shown in FIGS. 7 and 8. The vane 312 is adapted to interact with hot gases flowing through a gas path 313 of the gas turbine engine during use of the airfoil assembly 310. The support spar 314 extends axially through an interior cavity 322 formed in the vane 312 and is configured to receive force loads from the vane 312. The bias member is configured to urge a portion of the vane 312 and a portion of the support spar 314 toward each other maintain engagement of the components so that the force loads are transferred from the vane 312 to the support spar 314.

The ceramic matrix composite vane 312 includes an outer platform 324, an inner platform 326, an airfoil 328, and an outer vane mount 330 as shown in FIGS. 7 and 8. The inner platform 326 is spaced apart axially from the outer platform 324 relative to the axis 11 define inner and outer boundaries of the gas path 313. The airfoil 328 extends axially between and interconnects the outer platform 324 and the inner platform 326. The outer vane mount 330 extends axially outward away from the outer platform 324.

The outer vane mount 330 is shaped to include a bias member locating notch 366 as shown in FIGS. 7 and 8. The bias member locating notch 366 extends into an outer surface 348 of the outer vane mount 330. The locating notch 366 is sized to receive a portion of the bias member 316 and hold the bias member 316 in place.

The spar 314 includes a strut 350, load-transfer tabs 352, 354, and at least one retention tab 356 as shown in FIGS. 7 and 8. The strut 350 extends axially through the interior cavity 322 of the vane 312. The load-transfer tabs 352, 354 extends from the strut 350 and engages the inner surface 346 of the outer vane mount 330 outside the gas path 313. The retention tab 356 extends from the strut 350 opposite the load-transfer tabs 352, 354 and is configured to engage an inner surface 346 of the outer vane mount 330 during off-design conditions of the engine.

In the illustrative embodiment, the second load-transfer tab 354 is axially spaced apart from the first load-transfer tab 352 as shown in FIG. 7. Both the first and second load-transfer tabs 352, 354 are engaged with the outer surface 348 of the outer vane mount 330 along the pressure side 344 of the vane 312.

In the illustrative embodiment, the support spar 314 includes at least two retention tabs 356, 358 as shown in FIG. 8. The retention tabs 356, 358 extend from the strut 350 toward the outer vane mount 330 of the vane 312 on a suction side 342 of the vane 312. The second retention tab 358 is spaced apart from the first retention tab 356 along the suction side 342 of the vane 312.

In the illustrative embodiment, the support spar 314 is hollow and includes an inner strut surface 362 and an outer strut surface 364 as shown in FIGS. 7 and 8. The inner strut surface 362 defines a channel 365 that extends axially through the strut of the support spar 314. The outer strut surface 364 is opposite the inner strut surface 362. In some embodiments, the strut 350 may be hollow and include cooling holes to transmit cooling air from to the vane 312 and/or into the inter-disk cavity axially inward of the vane 312.

The bias member 316 includes a clip 372 as shown in FIG. 7. The clip 372 is arranged on the pressure side 344 of the ceramic matrix composite vane 312 and receives an axial terminating end 371 of the outer vane mount 330 in the clip 372. In the illustrative embodiment, the strut 350 extends axially outward past the axial terminating end 371 of the vane 312 so that the clip 372 extends from the strut 350 around the axial terminating end 371 of the outer vane mount 330 into the locating notch 366.

In the illustrative embodiment the clip 372 is fixed to the outer strut surface 364 and removably coupled with the vane 312. The clip 372 is fixed to the outer surface 364 of the strut 350 by welding or brazing. In other embodiments, the clip 372 may be fixed to the outer surface 364 of the strut 350 by another suitable method.

The clip 372 includes a locating end 374, a curved biasing portion 376, and a clip head 378 as shown in FIGS. 7 and 8. The locating end 374 is fixed to the outer strut surface 364 of the strut 350. The curved biasing portion 376 extends from the locating end 374 and around the axial outer end 371 of the vane 312. The clip head 378 extends from the curved biasing portion 376 and into the locating notch 366 formed in the vane 312. The clip head 378 engages the outer surface 348 of the outer vane mount 330 and the curved biasing portion 376 is configured to maintain engagement of the clip head 378 with the outer surface 348 of the outer vane mount 330.

In the illustrative embodiment, the airfoil assembly 310 includes a plurality of bias members 316 or clips 372 as shown in FIG. 6. Each of the clips 372 are spaced along the pressure side 344 of the vane 312. In other embodiments, the biasing member 316 may be a single clip 372 that extends along the pressure side 344 of the vane 312.

In some embodiments, the airfoil assembly 310 may include a single clip 372 with a locating end 374 and a plurality of clip heads 376, 378. The locating end 374 may extend along the pressure side 344 of the vane 312 and the plurality of clip heads 376, 378 may be spaced apart along the pressure side 344 of the vane 312 and each extend from the locating end 374 around a portion of the vane 312.

In the illustrative embodiment, the clip head 378 extends from the curved biasing portion 376 into the locating notch 366 formed in the outer vane mount 330. The curved biasing portion 376 is configured to maintain engagement of the clip head 378 with the outer vane mount 330 in the locating notch 366. In other embodiments, the clip head 378 may extend into another locating feature 366 formed in the outer vane mount 330.

Figure 9:
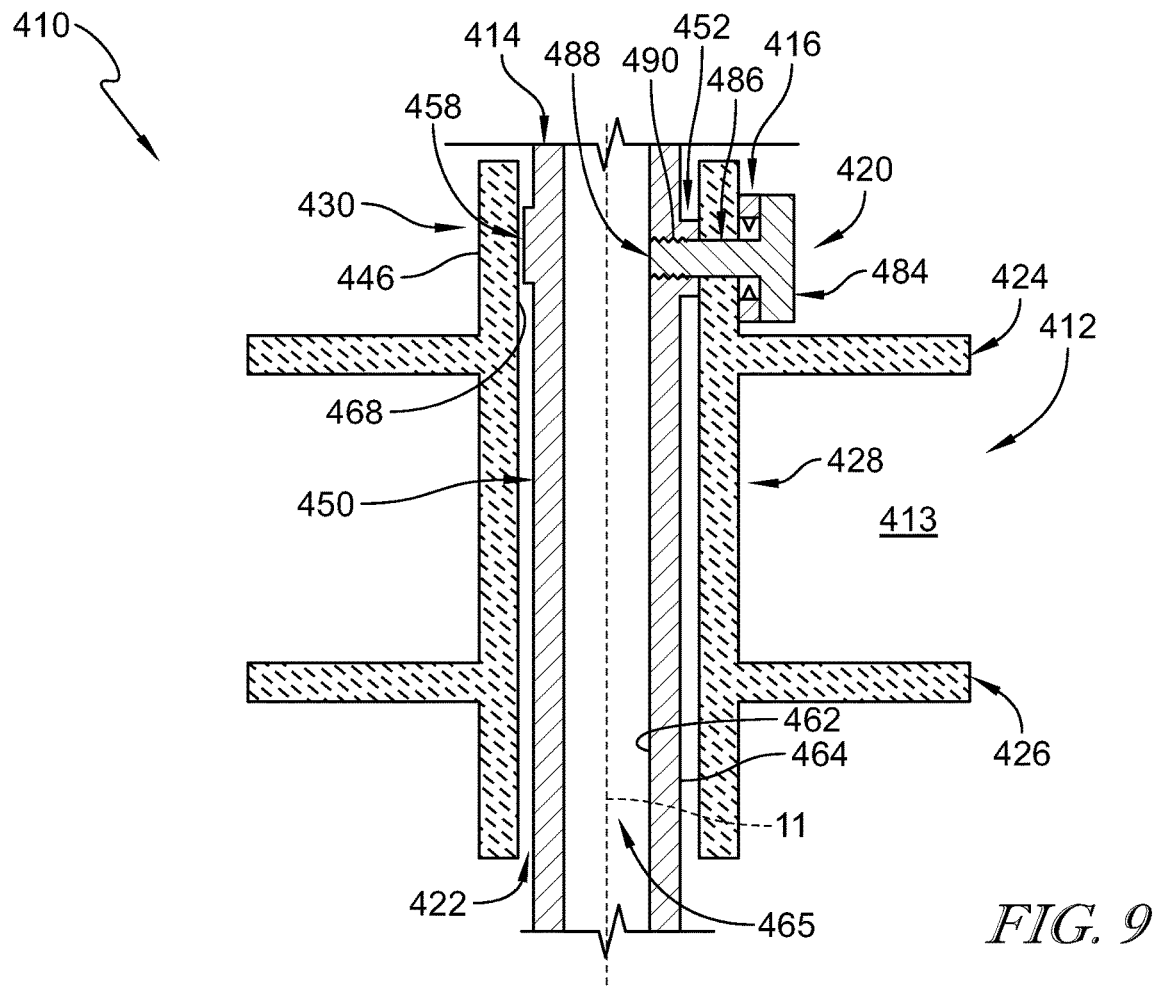
FIG. 9 is a cross-sectional view of another embodiment of an airfoil assembly showing the airfoil assembly includes a vane, a support spar that extends axially through an interior cavity formed in the vane, a bias member arranged between the vane and support spar, and a fastener that extends into the vane, the support spar, and the bias member to urge load-transfer tabs formed on the support spar into engagement with the vane.
Figure 10:
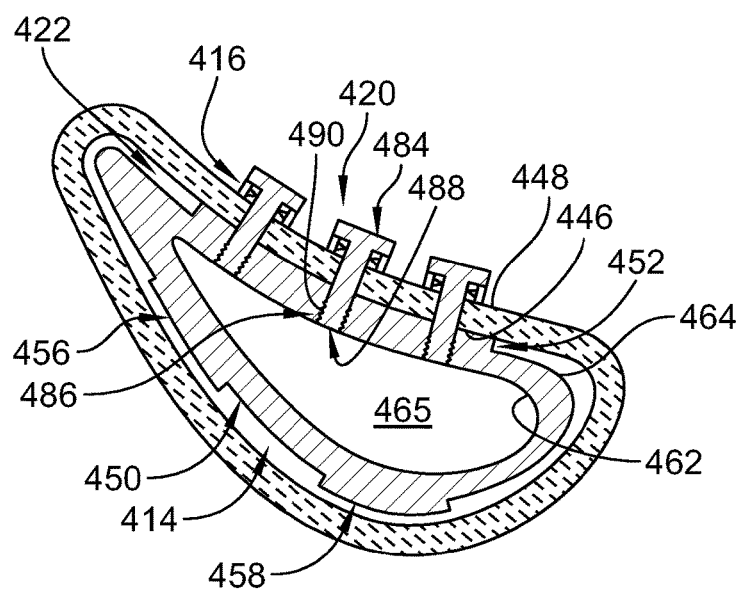
FIG. 10 is a cross-sectional view of the airfoil assembly of FIG. 9 showing the airfoil assembly includes a plurality of fasteners arranged along a pressure side of the vane.

Another embodiment of an airfoil assembly 410 in accordance with the present disclosure is shown in FIGS. 9 and 10. The airfoil assembly 410 is substantially similar to the airfoil assembly 10 shown in FIGS. 1-4 and described herein. Accordingly, similar reference numbers in the 400 series indicate features that are common between the airfoil assembly 10 and the airfoil assembly 410. The description of the airfoil assembly 10 is incorporated by reference to apply to the airfoil assembly 410, except in instances when it conflicts with the specific description and the drawings of the airfoil assembly 410.

The airfoil assembly includes a ceramic matrix composite vane 412, a metallic support spar 414, an optional bias member 416, and a fastener 420 as shown in FIGS. 9 and 10. The vane 412 is adapted to interact with hot gases flowing through a gas path 413 of the gas turbine engine during use of the airfoil assembly 410. The support spar 414 extends axially through an interior cavity 422 formed in the vane 412 and is configured to receive force loads from the vane 412. The bias member is configured to urge a portion of the vane 412 and a portion of the support spar 414 toward each other maintain engagement of the components so that the force loads are transferred from the vane 412 to the support spar 414. The fastener 420 extends into a portion of the vane 412 and the support spar 414 to engage the vane 412 with the support spar 414.

The ceramic matrix composite vane 412 includes an outer platform 424, an inner platform 426, an airfoil 428, and an outer vane mount 430 as shown in FIGS. 9 and 10. The inner platform 426 is spaced apart axially from the outer platform 424 relative to the axis 11 define inner and outer boundaries of the gas path 413. The airfoil 428 extends axially between and interconnects the outer platform 424 and the inner platform 426. The outer vane mount 430 extends axially outward away from the outer platform 424.

The spar 414 includes a strut 450, a load-transfer tab 452, and at least one retention tab 456 as shown in FIGS. 9 and 10. The strut 450 extends axially through the interior cavity 422 of the vane 412. The load-transfer tab 452 extends from the strut 450 and engages the inner surface 446 of the outer vane mount 430 outside the gas path 413. The retention tab 456 extends from the strut 450 opposite the load-transfer tab 452 and is configured to engage an inner surface 446 of the outer vane mount 430 during off-design conditions of the engine. In the illustrative embodiment, the load-transfer tab 452 is engaged with an inner surface 446 of the outer vane mount 430 on a pressure side 444 of the vane 412, while the retention tab 456 extends from the strut 450 toward a suction side 442 of the vane 412.

In the illustrative embodiment, the support spar 414 is hollow and includes an inner strut surface 462 and an outer strut surface 464 as shown in FIGS. 9 and 10. The inner strut surface 462 defines a channel 465 that extends axially through the strut of the support spar 414. The outer strut surface 464 is opposite the inner strut surface 462. In some embodiments, the strut 450 may be hollow and include cooling holes to transmit cooling air from to the vane 412 and/or into the inter-disk cavity axially inward of the vane 412.

The bias member 416 is arranged between a portion of the fastener 420 and an outer surface 448 of the outer vane mount 430 as shown in FIGS. 9 and 10. The bias member 416 is configured to seat the vane 412 against the load-transfer tab 452 on the support spar 414 under all conditions. The bias member 416 is also configured to set the compression of the components 412, 414, avoiding over compression and stress in the components 412, 414.

The bias member 416 may be a shim washer in the illustrative embodiment. In other embodiments, the bias member 416 may be another suitable biasing component to urge the outer vane mount 430 and the load-transfer tab 452 towards each other, such as a spring or compliant layer. In other embodiments, the bias member 416 may be omitted.

In other embodiments, the bias member 416 may be made of a material with a higher coefficient of thermal expansion than the fastener 420. By setting the length of the member 416 appropriately, the thermal expansion of the member 416 may be matched by the undergrowth of the ceramic vane 412 such that compression in the bolted joint may be maintained throughout operation. For instance, the member 416 may be made of STELLITE® 31 in such embodiments.

The fastener 420 includes a head 484 and a pin 486 as shown in FIGS. 9 and 10. The head 484 is arranged along the outer surface 448 of the outer vane mount 430. The pin 486 extends from the head 484 through the outer vane mount 430 and the support strut 414 into the channel 465 of the strut 450. In the illustrative embodiment, a terminating end 488 of the pin 486 that extends into the support spar 414 is threaded 490 and retains the fastener 420 in place relative to the other components 412, 414.

In the illustrative embodiment, the head 484 of the fastener 420 is a bolt head 484 as shown in FIGS. 9 and 10. In other embodiments, the head 484 of the fastener 420 may be a retaining ring with a washer 416 that biases the outer vane mount 430 and support spar 414. In other embodiments, the head 484 may be another suitable retention element such as a cotter key or integral features that would resist movement of the fastener 420 relative to the other components 412, 414.

In some embodiments, the terminating end 488 of the pin may extend through a hole formed in the support spar 414 into the hollow cavity 465 extends axially through the strut 450. The pin 486 may be retained to the support spar 414 by a retaining ring, cotter key, or another suitable retaining device attached to the terminating end 488 of the pin 486 extending through the hole.

In the illustrative embodiment, the fastener 420 extends through support spar 414 at the load-transfer tab 452 as shown in FIGS. 9 and 10. The pin 486 extends through the outer vane mount 430 and the load-transfer tab 452 into channel 465.

Figure 11:
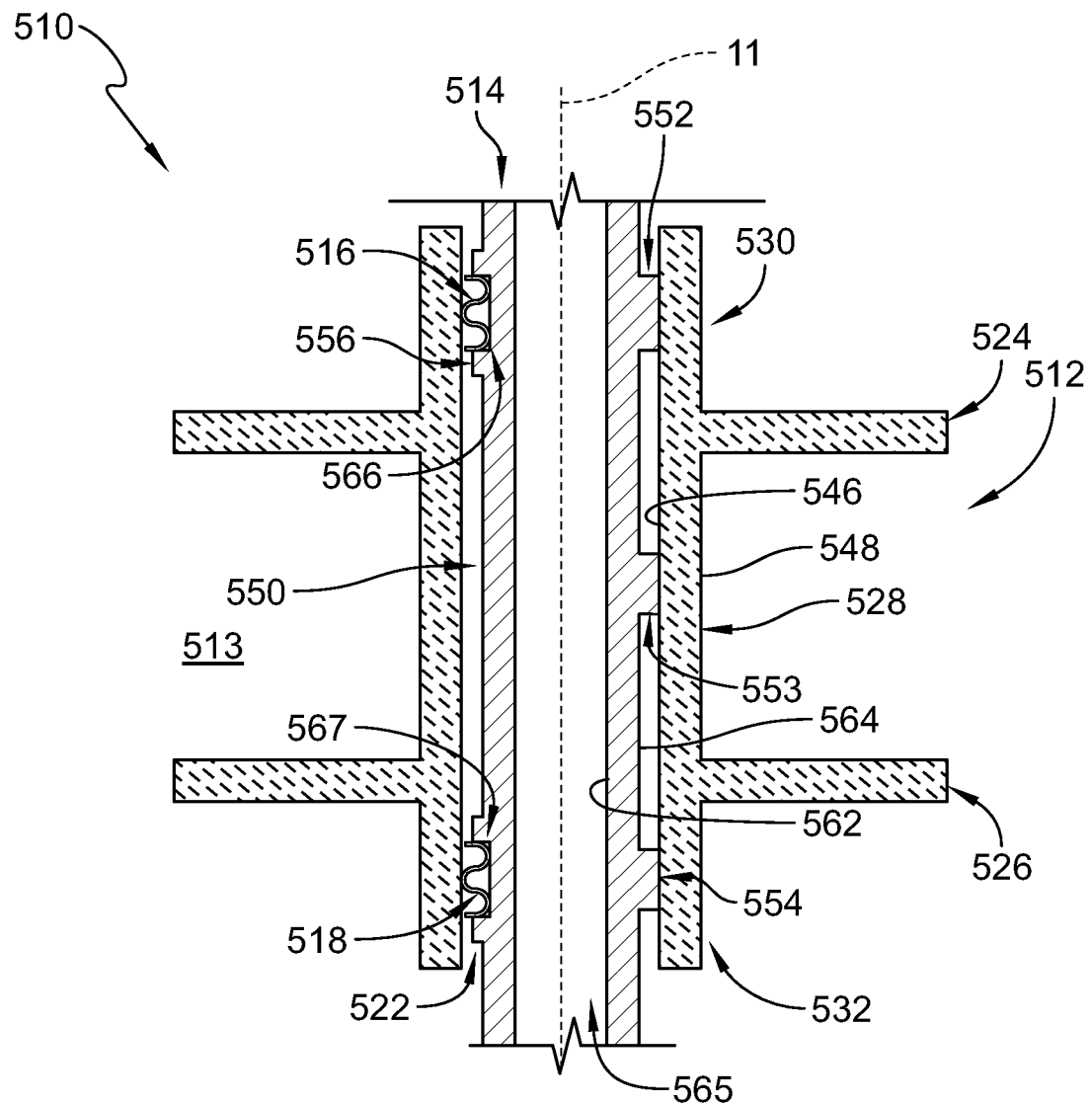
FIG. 11 is a cross-sectional view of another embodiment of an airfoil assembly showing the airfoil assembly includes a vane, a support spar that extends axially through an interior cavity formed in the vane, and outer and inner bias members configured to urge the vane and support spar toward each other and into engagement.

Another embodiment of an airfoil assembly 510 in accordance with the present disclosure is shown in FIG. 11. The airfoil assembly 510 is substantially similar to the airfoil assembly 10 shown in FIGS. 1-4 and described herein. Accordingly, similar reference numbers in the 500 series indicate features that are common between the airfoil assembly 10 and the airfoil assembly 510. The description of the airfoil assembly 10 is incorporated by reference to apply to the airfoil assembly 510, except in instances when it conflicts with the specific description and the drawings of the airfoil assembly 510.

The airfoil assembly includes a ceramic matrix composite vane 512, a metallic support spar 514, and bias members 516, 518 as shown in FIG. 11. The vane 512 is adapted to interact with hot gases flowing through a gas path 513 of the gas turbine engine during use of the airfoil assembly 510. The support spar 514 extends axially through an interior cavity 522 formed in the vane 512 and is configured to receive force loads from the vane 512. The bias members 516, 518 are configured to urge a portion of the vane 512 and a portion of the support spar 514 toward each other maintain engagement of the components so that the force loads are transferred from the vane 512 to the support spar 514.

The ceramic matrix composite vane 512 includes an outer platform 524, an inner platform 526, an airfoil 528, an outer vane mount 530, and an inner vane mount 532 as shown in FIG. 11. The inner platform 526 is spaced apart axially from the outer platform 524 relative to the axis 11 define inner and outer boundaries of the gas path 513. The airfoil 528 extends axially between and interconnects the outer platform 524 and the inner platform 526. The outer vane mount 530 extends axially outward away from the outer platform 524, while the inner vane mount 532 extends axially inward and away from the inner platform 526.

The vane 512 also have an inner surface 546 and an outer surface 548 as shown in FIG. 11. The inner surface 546 defines a portion of the interior cavity 522. The outer surface 548 is opposite the inner surface 546.

The support spar 514 includes a strut 550, load-transfer tabs 552, 553, 554, and retention features 556, 558 as shown in FIGS. 9 and 10. The strut 550 extends axially through the interior cavity 522 of the vane 512. The load-transfer tabs 552, 553, 554 extend from the strut 550 and engage the inner surface 546 of the vane 512. The retention features 556, 558 extend from the strut 550 opposite the load-transfer tabs 552, 553, 554 and are configured to engage the inner surface 546 of the vane 512 during off-design conditions of the engine.

In the illustrative embodiment, the load-transfer tabs 552, 553, 554 engage with the inner surface 546 of the vane 512 on a pressure side 544 of the vane 512, while the retention features 556, 558 extend from the strut 550 toward a suction side 542 of the vane 512.

In the illustrative embodiment, the support spar 514 includes at least three load-transfer tabs 552, 553, 554 as shown in FIG. 11. The second load-transfer tab 553 is axially spaced apart from the first load-transfer tab 552 along the strut 550. The third load-transfer tab 554 is arranged axially between the first and second load-transfer tabs 552, 553.

In the illustrative embodiment, the first load-transfer tab 552 engages the inner surface 546 at the outer vane mount 530 of the vane 512, while the second load-transfer tab 553 engages the inner surface 546 at the inner vane mount 532 of the vane 512. The third load-transfer tab 554 engages the inner surface 546 at the airfoil 528 of the vane 12.

In other embodiments, the support spar 514 may only include one load-transfer tab 553 that engages the inner surface 546 at the inner vane mount 532. In other embodiments, the support spar 514 may only include two load-transfer tabs 552, 553 that engage the inner surface 546 at the outer and inner vane mounts 530, 532.

The strut 550 of the support spar 514 is shaped to include an outer bias member locating notch 566 and an inner bias member locating notch 567 as shown in FIG. 11. The outer locating notch 566 extends into an outer surface 564 of the support spar 514 and opens toward the inner surface 546 at the outer vane mount 530. The inner locating notch 567 extends into the outer surface 564 of the support spar 514 and opens toward the inner surface 546 at the inner vane mount 532. Both the outer and inner locating notches 566, 567 are sized to receive the corresponding bias member 516, 518 and hold the bias members 516, 518 in place relative to the ceramic matrix composite vane 512. The locating notches 566, 567 are also configured to control the compression of the bias members 516, 518.

In the illustrative embodiment, the airfoil assembly 510 includes an outer bias member 516 and an inner bias member 518 as shown in FIG. 11. The outer bias member 516 is located in the interior cavity 522 between the outer vane mount 530 and the support spar 514 in the outer locating notch 566. The inner bias member 518 is locating in the interior cavity 522 between the inner vane mount 532 and the support spar 514 in the inner locating notch 567. In other embodiments, the airfoil assembly 510 may only include one bias member 518 that engages the inner vane mount 532 to urge the load-transfer tab 553 of the support spar 514 into engagement with the inner vane mount 532 of the vane 512.

The present disclosure relates to load transferring of an airfoil assembly 10, 210, 310, 410, 510 within a gas turbine engine. Specifically, the present disclosure teaches transferring loads from a ceramic matrix composite (CMC) turbine vane 12, 212, 312, 412, 512 to a metallic support structure 14, 214, 314, 414, 514.

As there is a significant difference in the coefficient of thermal expansion between ceramic matrix composite materials and high temperature metals, the metallic support spar 14, 214, 314, 414, 514 may outgrow or expand more than the ceramic matrix composite vane 12, 212, 312, 412, 512, which may not allow clamping arrangements of the airfoil assembly 10, 210, 310, 410, 510. Due to the low strength capability of the ceramic matrix composite materials, applying significant pre-load to the ceramic matrix composite materials of the airfoil assembly 10, 210, 310, 410, 510 may be difficult.

The low strength capability and the relatively high stiffness of the ceramic matrix composite materials may make transferring loading of the vane 12, 212, 312, 412, 512 difficult. Any load-transfer features may not be able to conform to the ceramic matrix composite airfoil shape and offer distributed loading.

As a solution, the present disclosure teaches discrete load-transfer features or load-transfer tabs 52, 54, 252, 254, 352, 354, 452, 552, 553, 554 on a support spar 14, 214, 314, 414, 514 as shown in FIGS. 2-12. The load-transfer tabs 52, 54, 252, 254, 352, 354, 452, 552, 553, 554 offer a determinant load-transferring system and control the orientation of the ceramic matrix composite vane 12, 212, 312, 412, 512. As such, aspects may affect the turbine capacity through setting the throat area between adjacent vanes 12, 212, 312, 412, 512, the load-transfer arrangement of the present disclosure may help increase engine efficiency.

An embodiment of the airfoil assembly 10 is shown in FIGS. 1-3. The airfoil assembly 10 includes a ceramic matrix composite vane 12 with ceramic matrix composite platform protrusions 24, 26 to incorporate the load-transfer tabs 52 outside of the hot gas path region 13. The airfoil assembly 10 also includes a support spar 14 with load-transfer tabs 52, 54 to address the vane support requirements across the operating range.

In the illustrative embodiment, the load-transfer tabs 52, 54 are a hard-stop, pad, or datum. The datums locate the ceramic matrix composite component 12 and transmit the aerodynamic forces. In the illustrative embodiment, load-transfer tabs 52, 54 are arranged on the pressure side 44 of the vane 12, while a retention feature 56 is arranged on the suction side 42 of the vane 12. The feature 56 located on the suction side 42 of the vane 12 acts as a retention tab to prevent gross movement of the ceramic matrix composite component 12 during off-design conditions.

In the illustrative embodiments, the airfoil assembly 10, 210, 310, 410, 510 further includes a pre-load feature or bias member 16, 216, 316, 416, 516, 518. The bias member 16, 216, 316, 416, 516, 518 is configured to ensure that the ceramic matrix composite component 12, 212, 312, 412, 512 is correctly located onto the load-transfer tabs 52, 54, 252, 254, 352, 354, 452, 552, 553, 554.

The load-transfer tabs 52, 54, 252, 254, 352, 354, 452, 552, 553, 554 may also be configured to engage the vane 12, 212, 312, 412, 512 across a typical flight cycle so that the orientation of the aerodynamic load applied to a vane 12, 212, 312, 412, 512 does not dramatically change. As such, under load the ceramic matrix composite vane 12, 212, 312, 412, 512 may be biased towards the load-transfer tabs 52, 54, 252, 254, 352, 354, 452, 552, 553, 554 in a similar direction but with varying magnitude.

Under extreme operating conditions, such as engine surge, the orientation of the aerodynamic load may shift. At engine shutdown or when the part is un-loaded, the ceramic matrix composite vane 12, 212, 312, 412, 512 may then be unsupported and due to the circumferential distribution of the components around the engine. All parts may likely unload in different directions and with varying magnitudes.

To prevent unloading, the ceramic matrix composite vane 12, 212, 312, 412, 512 may be biased towards the load-transfer tabs 52, 54, 252, 254, 352, 354, 452, 552, 553, 554 such that the ceramic matrix composite vane 212, 312, 412, 512 retain position when the vane 12, 212, 312, 412, 512 is unloaded. The magnitude of this pre-load may be greater than the inertia of the ceramic matrix composite vane 12, 212, 312, 412, 512 under typical engine-unpowered vibration, airframe operating loads, and/or landing loads. The pre-load may be no greater than this value as it must be in the direction of the aerodynamic load and may add to that load vector. In the illustrative embodiments, the airfoil assemblies 10, 210, 310, 410 510 each include load-transfer features and variations of the pre-load feature.

In the illustrative embodiment of FIGS. 1-3, the airfoil assembly 10 includes the support spar 14 that creates load-transfer tabs 52, 54 that contact on the external or outer surface 48 of the ceramic matrix composite vane 12. In other embodiments, the load-transfer tabs 52, 54 may contact the internal or inner surface 46 of the ceramic matrix composite vane 12.

In the illustrative embodiments, the bias member 16, 216, 316, 416, 516, 518 may be configured to bias the load-transfer tabs 52, 54, 252, 254, 352, 354, 452, 552, 553, 554 and the outer vane mount 30, 230, 330, 430, 530 of the vane 12, 212, 312, 412, 512 toward each other at cold conditions, but also configured to minimize the load at high temperatures. Minimizing the bias force or pre-load at high temperatures may reduce the stress in the vane 12, 212, 312, 412, 512. Biasing the load-transfer tabs 52, 54, 252, 254, 352, 354, 452, 552, 553, 554 may also improve the creep performance of the airfoil assembly 10, 210, 310, 410, 510, as the creep rate may be proportional to the load/stress within the part and hence, should reduce with temperature.

In the illustrative embodiments, positioning the bias member 16, 216, 316, 416, 516, 518 outboard of the hot gas path region 13, 213, 313, 413, 513 may reduce the temperature of the bias member 16, 216, 316, 416, 516, 518 so as to avoid excessive creep and stress relaxation. Additionally, locating the bias member 16, 216, 316, 416, 516, 518 outside the gas path 13, 213, 313, 413, 513 may allow for cooling the features as necessary.

Also, the high level of thermal radiation within the inside of the ceramic matrix composite vane 12, 212, 312, 412, 512 in the hot gas path region 13, 213, 313, 413, 513 along with the minimal space may limit the ability to apply cooling or apply heat shielding to the features. However, outside of the gas path 13, 213, 313, 413, 513, the amount of available space to apply cooling air or heat shield may be greater. In addition, the radiation loading of heat onto the features is expected to be drastically lower in outside of the gas path 13, 213, 313, 413, 513.

In the illustrative embodiments, the load-transfer tab 52, 54, 252, 254, 352, 354, 552, 553, 554 is shaped to include a locating notch 66, 266, 366, 566, 567 or lips around the bias member 16, 216, 316, 516, 518 to limit the amount of compression possible on the bias member 16, 216, 316, 516, 518. In FIGS. 1-3, the lips or retention tabs 56 may also be configured to contain the bias member 16 in the proper location.

In the illustrative embodiment of FIGS. 5-8, the bias member 216, 316 includes sprung metallic clips 272, 372 to couple the ceramic matrix composite vane 212, 312 to a support spar 214, 314. The clips 272, 372 may be discreet sections as shown in FIGS. 6 and 8. In other embodiments, the clips 272, 372 may be a singular clip 272, 372 as needed.

The clips 272, 372 may be retained by spring forces encouraging interference features into receiving features on the support spar 214 or receiving features on the vane 312. In the illustrative embodiment of FIG. 5, the clip 272 includes a locating end 274 that mates with the locating notch 266 formed in the support spar 214. In the illustrative embodiment of FIG. 6, the clip 372 includes a clip head 378 that mates with the locating notch 366 formed in the vane 312. Such interference and receiving features may be advantageous as it may allow tolerance of manufacturing variability and thermal mismatch.

In the illustrative embodiments, the airfoil assembly 10, 210, 310 may further include a seal member 61, 261, 361 as shown in FIGS. 7 and 8. The seal member 61, 261, 361 may be a rope seal, between the ceramic matrix composite vane 312 and the support spar 314. The support spar 314 may contact the ceramic matrix composite vane 312 via discreet contact features or load-transfer tabs 52, 54, 252, 254, 352, 354.

In the illustrative embodiment, the load-transfer tabs 52, 54, 252, 254, 352, 354, 552, 553, 554 may be continuous rails oriented substantially in the perimeter direction as oriented to the ceramic matrix composite attachment feature or outer vane mount 30, 230, 330, 430, 530. In other embodiments, the tabs 52, 54, 252, 254, 352, 354, 552, 553, 554 may be discontinuous bumps/protrusions.

In the illustrative embodiments, the airfoil assembly 310 may include clips 372 made out of thin high temperature nickel alloy stock and permanently fixed (i.e. welded, brazed, etc.). In other embodiments, the clips 272 may be a removable assembly to the support spar 214. In some embodiments, a simple clip 272, 372 formed of sheet stock as a permanent assembly to the support spar 214, 314 may minimize the cost and the permanent assembly process.

In the illustrative embodiment of FIGS. 9 and 10, the airfoil assembly 410 includes a load pad 452, a post or fastener 420, a bias member or resilient component 416. The load pads 452 may be formed on either of the outer strut surface 462 of the fastener 420 and contact the corresponding surface of the outer vane mount 430.

The fastener 420 may be assembled through a hole in the ceramic matrix composite vane 412 and attached to the metallic support spar 414. This fastener 420 may be threaded 490 on one or both ends 488 and may pass through a hole in the metallic support spar 414. The fastener 420 may be blocked from removal from the hole by a retaining ring, cotter key, or other such retaining device 484.

The bias member or resilient component 416 may be located between the outer surface 448 of the ceramic matrix composite vane 412 and the head 484 of the fastener 420. In other embodiments, the bias member 416 may be located in the interior cavity 422 between the support spar 414 and the vane 412. In some embodiments, the resilient layer 416 may be a high temperature nickel alloy Belleville washer, a high temperature nickel alloy wave washer, or a high temperature gasket material such as THERMICULITE® or mica board (metal foil encapsulated or not).

In the illustrative embodiment, a feature 484 at the external end of the fastener 420 may be fixed to a pin 486 and may compress and contain the resilient component 416. This feature 484 may be a head 484 on the pin 486 (similar to a bolt head), a nut, or a separate washer type piece with a slip fit over the pin 486. If a separate washer is utilized, a retention feature such as a retaining ring, cotter key, or integral features may be used allow pressed assembly, but also resist movement in the opposite direction. If a washer and retaining ring type retention is utilized, a shim washer(s) may be used to set the compression of the resilient component 416.

An optional feature may be a spacer. The spacer may allow the bias member 416 to be compressed only to a height set by the spacer. Such a spacer may be a separate piece or integral with the spring retention piece 416 or integral with the outer vane mount 430 of the ceramic matrix composite component 412.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil assembly for a gas turbine engine, the airfoil assembly comprising
   a ceramic matrix composite vane adapted to interact with hot gases flowing through a gas path of the gas turbine engine during use of the airfoil assembly, the ceramic matrix composite vane including an outer platform that defines an outer boundary of the gas path, an inner platform spaced apart axially from the outer platform relative to an axis to define an inner boundary of the gas path, an airfoil that extends axially between and interconnects the outer platform and the inner platform, and an outer vane mount that extends axially outward away from the outer platform,
   a metallic support spar configured to receive force loads from the ceramic matrix composite vane, the metallic support spar including a strut that extends axially through an interior cavity formed in the ceramic matrix composite vane and at least one load-transfer tab that extends from the strut toward the outer vane mount of the ceramic matrix composite vane and engages the outer vane mount to transmit the force loads from the ceramic matrix composite vane to the metallic support spar during use of the airfoil assembly, and
   a bias member configured to urge the outer vane mount and the at least one load-transfer tab toward each other on a pressure side of the ceramic matrix composite vane and maintain engagement of the at least one load-transfer tab with the outer vane mount of the ceramic matrix composite vane.

2. The airfoil assembly of claim 1, wherein the bias member is located in the interior cavity between the outer vane mount and the metallic support spar on a suction side of the ceramic matrix composite vane.

3. The airfoil assembly of claim 2, wherein the strut of the metallic support spar is shaped to include a locating notch that opens toward the suction side of the ceramic matrix composite vane and receives the bias member to hold the bias member in place relative to the ceramic matrix composite vane.

4. The airfoil assembly of claim 1, wherein the bias member includes a clip arranged on the pressure side of the ceramic matrix composite vane that receives a portion of the outer vane mount and a portion of the metallic support spar in the clip.

5. The airfoil assembly of claim 4, wherein the bias member includes a plurality of clips arranged along the pressure side of the ceramic matrix composite vane.

6. The airfoil assembly of claim 1, wherein the bias member includes a clip fixed with the strut of the metallic support spar on a pressure side of the metallic support spar and the clip receives a radial terminating end of the outer vane mount.

7. The airfoil assembly of claim 1, wherein the airfoil assembly further includes a fastener that extends into the outer vane mount and the metallic support spar to engage the outer vane mount with the at least one load-transfer tab.

8. The airfoil assembly of claim 1, wherein the metallic support spar includes a first load-transfer tab and a second load-transfer tab spaced apart axially from the first load-transfer tab to define a seal channel therebetween, and wherein the airfoil assembly further includes a seal arranged in the seal channel.

9. The airfoil assembly of claim 8, wherein the first load-transfer tab and the second load-transfer tab extend along a perimeter of the pressure side of the metallic support spar.

10. An airfoil assembly comprising
    a vane including an outer platform, an inner platform spaced apart axially from the outer platform relative to an axis, and an airfoil that extends axially between and interconnects the outer platform and the inner platform, and
    a support spar that extends axially through a portion of the vane,
    and a bias member configured to urge the vane and a portion of the support spar to maintain direct contact with each other during use of the airfoil assembly.

11. The airfoil assembly of claim 10, wherein the vane includes a leading edge, a trailing edge, a pressure side, and a suction side, and wherein the support spar is shaped to include at least one load-transfer tab that extends from the support spar and engages with the vane on the pressure side of the vane.

12. The airfoil assembly of claim 11, wherein the bias member extends between the vane and the support spar on a suction side of the vane.

13. The airfoil assembly of claim 10, wherein the vane further includes an outer vane mount that extends axially away from the outer platform and the bias member includes a clip that receives a portion of the outer vane mount and a portion of the support spar in the clip.

14. The airfoil assembly of claim 10, wherein the vane further includes an outer vane mount that extends axially away from the outer platform and the bias member includes a clip fixed with the support spar on a pressure side of the support spar and receives a radial terminating end of the outer vane mount.

15. The airfoil assembly of claim 10, wherein the vane further includes an outer vane mount that extends axially away from the outer platform and the bias member includes a fastener that extends into the outer vane mount and the metallic support spar to engage the outer vane mount with at least one load-transfer tab formed in the support spar.

16. The airfoil assembly of claim 10, wherein the vane further includes an outer vane mount that extends axially away from the outer platform and wherein the outer vane mount includes an inner surface that defines a portion of an interior cavity that extends axially into the vane and an outer surface opposite the inner surface and, and wherein the support spar includes a strut that extends axially through the interior cavity of the vane and at least one load-transfer tab that extends from the support spar and engages with the inner surface of the outer vane mount on a pressure side of the vane.

17. The airfoil assembly of claim 16, wherein the bias member is located in the interior cavity between inner surface of the outer vane mount and the metallic support spar on a suction side of the vane.

18. The airfoil assembly of claim 16, wherein the bias member is arranged on the pressure side of the vane and is configured to urge the at least one load-transfer tab toward engagement with the outer vane mount on the pressure side of the vane.

19. A method comprising,
providing a vane and a support spar, the vane including an outer platform, an inner platform spaced apart axially from the outer platform relative to an axis, an airfoil that extends axially between and interconnects the outer platform and the inner platform, and an outer vane mount that extends axially outward away from the outer platform, and the support spar including a strut and a load-transfer tab that extends from the strut,
arranging the support spar through an interior cavity that extends axially through the vane,
biasing the vane and the support spar toward one another to cause the load-transfer tab to directly contact the outer vane mount during use of the airfoil assembly.

20. The method of claim 19, wherein the biasing step includes engaging the vane and the support spar with a bias member.

* * * * *